United States Patent [19]

Watanabe et al.

[11] E Re. 30,667

[45] Reissued Jul. 7, 1981

[54] POLY-DICARBON MONOFLUORIDE

[75] Inventors: Nobuatsu Watanabe, No. 136, Uguisu-dai, Nagaokakyo-shi, Kyoto, Japan; Yasushi Kita, Hiroshima, Japan

[73] Assignees: Nobuatsu Watanabe; Applied Science Research Institute, both of Kyoto, Japan

[21] Appl. No.: 55,358

[22] Filed: Jul. 6, 1979

Related U.S. Patent Documents

Reissue of:

[64] Patent No.: 4,139,474
Issued: Feb. 13, 1979
Appl. No.: 824,911
Filed: Aug. 15, 1977

[30] Foreign Application Priority Data

Feb. 22, 1977 [JP] Japan ..... 52-017823

[51] Int. Cl.[3] ..... C09K 3/00; C07C 19/08

[52] U.S. Cl. ..... 252/1; 106/2; 106/287.35; 252/9; 260/2.01; 429/212; 570/124

[58] Field of Search ..... 106/2, 287.35; 252/1, 252/9; 260/2.01, 648 F; 429/212

[56] References Cited

FOREIGN PATENT DOCUMENTS

| | | | |
|---|---|---|---|
| 2126595 | 10/1972 | France | 260/648 F |
| 2232510 | 1/1975 | France . | |
| 48-103637 | 12/1973 | Japan . | |
| 50-114398 | 9/1975 | Japan . | |
| 51-5296 | 1/1976 | Japan . | |

OTHER PUBLICATIONS

Bernard et al., Chem. Abs., vol. 77, 9330k, p. 352, 1972.

*Primary Examiner*—Leland A. Sebastian
*Attorney, Agent, or Firm*—Armstrong, Nikaido, Marmelstein & Kubovcik

[57] ABSTRACT

A novel chemical compound poly-dicarbon monofluoride represented by the formula $(C_2F)_n$ and having a crystalline structure of packing form [featured by its layer structure as shown in FIG. 12 hereof] stacked with an interlayer spacing of about 9.0 Å. Such new compound can be produced under relatively mild reaction conditions and obtained in a yield as large as 100% with respect to not only the carbon material employed but also the fluorine employed. The new compound is black under the formation conditions and of low crystallinity, but it can be easily converted to that of high crystallinity and white color by heat treatment in a fluorine atmosphere. The new compound has a wide variety of uses, for example, as lubricants, stain-resistant and water-repellent materials, cathode materials in high energy primary cells, etc.

5 Claims, 16 Drawing Figures

X-RAY DIFFRACTION POWDER PATTERNS OF PRODUCTS PREPARED AT VARIED REACTION TEMPERATURES

X-RAY DIFFRACTION POWDER PATTERNS

X-RAY DIFFRACTION POWDER PATTERNS

IR SPECTRUM OF PRODUCT OBTAINED BY REACTION AT 620°C FOR 48 HRS. IN $F_2$ (200 mm Hg)

IR SPECTRUM OF PRODUCT OBTAINED BY REACTION AT 375°C FOR 120HRS. IN $F_2$ (200mmHg)

DTA CURVES

POLY-DICARBON MONOFLUORIDE

Matter enclosed in heavy brackets [ ] appears in the original patent but forms no part of this reissue specification; matter printed in italics indicates the additions made by reissue.

This invention relates to a novel polycarbon fluoride and a process for preparing the same. More particularly, this invention is concerned with a novel chemical compound poly-dicarbon monofluoride represented by the formula $(C_2F)_n$ and a process for preparing the same.

Conventionally, there have been reported a series of compositions of the formula $(CF_x)_n$ wherein x varies widely in the range of from 0.68 to 1.12. For example, W. Rüdorff et al., J. L. Margrave et al. and N. Watanabe et al. have reported that such compositions of $CF_{0.68}$ to $CF_{1.12}$ are obtained by direct fluorination of graphite materials at temperatures of 410° to 630° C. and have, in their respective crystalline structures, interlayer spacings varying widely in the range of from 8.9 to 5.8 Å. Thereafter, studies were further made for determining the structures of the compositions of $(CF_x)_n$, and it has been proposed that with respect to the compositions of $(CF_x)_n$ wherein x is equal to or less than 1.0 the compositions consist of blocks of CF stoichiometry and blocks of unreacted graphite, with small amounts of $CF_2$ groups and $CF_3$ groups preset in the outermost surface regions of the particles of the compositions, and with respect to the compositions of $(CF_x)_n$ wherein x is more than 1.0 the compositions consist of blocks of CF stoichiometry, with small amounts of $CF_2$ groups and $CF_3$ groups present in the outermost surface regions of the particles of the compositions.

Still further studies by the present inventors gave a definite structure of $(CF)_n$, namely $(CF_x)_n$ wherein $X=1.0$, according to which a chemical compound $(CF)_n$ has a crystalline structure of packing form in which a layer structure as shown in FIG. 1 (which will be explained later) is stacked with an interlayer spacing of about 5.8 Å. Such compound $(CF)_n$ can be produced by reacting a carbon material with fluorine at a temperature of about 410° to about 630° C. Compounds of $(CF)_n$ are produced with varied crystallinities and those having high cristallinity are white solids. The compound $(CF)_n$ is thermally stable, chemically unreactive and electrically insulating, and have low surface free energy. It is known that the compound $(CF)_n$ is extremely useful as a solid lubricant since it has a lower coefficient of friction and longer wear life over wide ranges of temperature, pressure and loads than such other solid lubricants as graphite and molybdenum disulfide. It also is known that the compound $(CF)_n$ has a use as a cathode material in high energy primary cells.

As stated above, the conventionally known compound $(CF)_n$ has a wide variety of practical uses, but it has fatal drawbacks or disadvantages in the production thereof. Illustratively stated, the thermal decomposition temperature of $(CF)_n$ is extremely near to the temperature employed for the formation of the $(CF)_n$. For example, when petroleum coke (not graphitized by heat treatment) is employed as a carbon material and reacted with fluorine, the desired $(CF)_n$ is obtained by the reaction of at 400° C. for several hours but the so obtained $(CF)_n$ easily decomposes at 450° C. Whereas, when natural graphite is employed as a carbon material and reacted with fluorine, the desired $(CF)_n$ is obtained by the reaction of at 600° C. for 48 hours but the so obtained $(CF)_n$ easily decomposes at 610° C. Generally, the temperature difference between the formation temperature of $(CF)_n$ and the decomposition temperature is only about 10° to about 50° C. It should be further noted that both the formation reaction of $(CF)_n$ and the decomposition reaction thereof are exothermic. Hence, with the progress of formation of $(CF)_n$, the temperature of the reaction system is liable to rise and, at the same time, the low crystallinity $(CF)_n$ moiety partially formed is caused to decompose, whereby heat is further generated by such decomposition reaction to further elevate the temperature of the reaction system. As a result of this, the decomposition of the formed $(CF)_n$ is accelerated, and occasionally the temperature of the whole reaction system is caused to rise to above the decomposition temperature of the formed $(CF)_n$, whereby all of the formed $(CF)_n$ is caused to completely decompose to amorphous carbon and gaseous fluorocarbons such as $CF_4$. Consequently, the yield of $(CF)_n$ is extremely low. For this reason, in order to obtain $(CF)_n$ in an improved yield, there have been made such attempts that the temperature of the reaction system is always adjusted to the temperature of formation of $(CF)_n$ and that the reaction is effected in multiple steps. However, the former encounters difficulty in controlling the temperature of the reaction system, and the latter leads to complicatedness of the process. Neither of them is practical. Accordingly, the present, $(CF)_n$ is produced in a yield as low as only several percent in relation to the fluorine employed and several ten percent in relation to the carbon material employed.

As described above, the production of $(CF)_n$ is inevitably and disadvantageously accompanied by its liability to decomposition. Therefore, when the reaction of a carbon material with fluorine is effected in a closed system, the fluorine partial pressure in the reaction interface regions is reduced due to presence of gaseous fluorocarbons formed by the decomposition of the formed $(CF)_n$, leading to extreme reduction of the rate of formation of (CF) whereby there is hardly produced a compound $(CF)_n$. For this reason, there is usually employed a so-called fluorine flow method for the production of $(CF)_n$. However, even with the flow method, the yield of $(CF)_n$ in relation to the fluorine employed is extremely low and, in addition, the unreacted fluorine flows out and is and usually burnt, leading to large loss of expensive fluorine. Further, since the reaction for the production of $(CF)_n$ is generally conducted at relatively high temperatures, for example, about 550° to about 630° C. for shortening the reaction time, corrosion of the reaction vessel by a high temperature fluorine gas is large and cannot be neglected from the view point of chemical engineering.

As fully understood from the above, the excellent properties of $(CF)_n$ is highly appreciable, but due to the difficulties in the production thereof, the practical applications of $(CF)_n$ have been hardly realized due to high cost thereof.

Accordingly, it is one and principal object to provide a novel chemical compound polycarbon fluoride having excellent properties comparable or superior to those of $(CF)_n$ at low cost.

It is another object of the present invention to provide a polycarbon fluoride composition consisting essentially of the novel chemical compound polycarbon fluoride and $(CF)_n$ at low cost, which composition has excellent properties comparable or superior to those of $(CF)_n$.

It is still another object of the present invention to provide a process for preparing a novel chemical compound polycarbon fluoride having excellent properties comparable or superior to those of $(CF)_n$.

It is further object of the present invention to provide a process of the kind described above, which can be economically carried out to prepare the desired compound in a yield as extremely high as 100% in relation to not only the carbon material employed but also the fluorine employed.

It is still a further object of the present invention to provide a process of the kind described above, in which there is incorporated a further process to increase crystallinity of the product so that the product is suitably applicable to various uses.

The foregoing and other objects, featues and features of the present invention will be apparent to those skilled in the art from the following detailed description taken in connection with the accompanying drawings in which.

Figure 12:
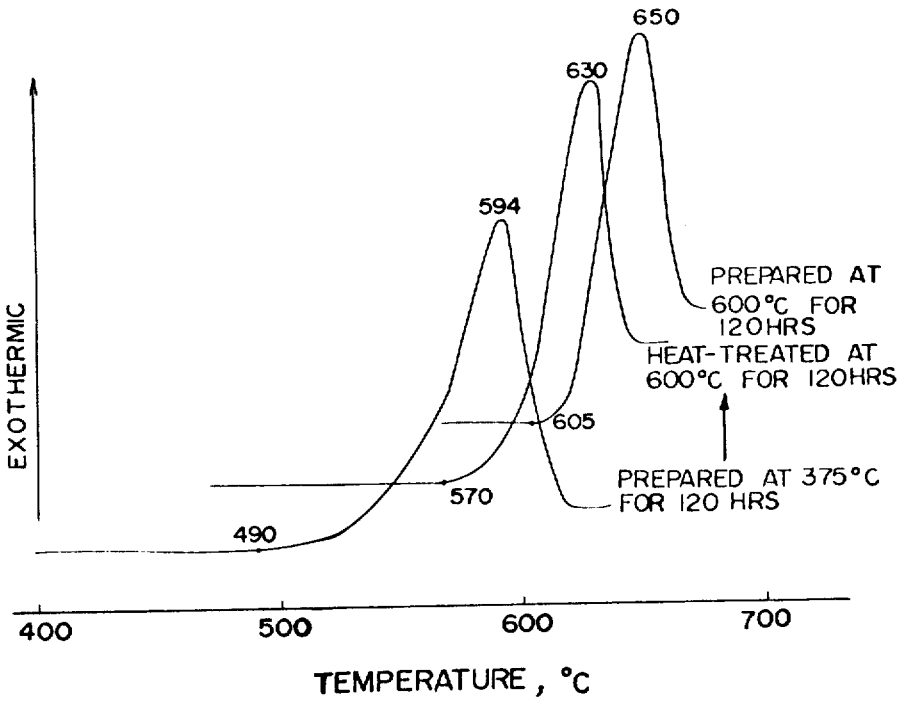
[FIG. 12 is a diagram showing a layer structure of $(C_2F)_n$ according to the present invention;]
Figure 13:
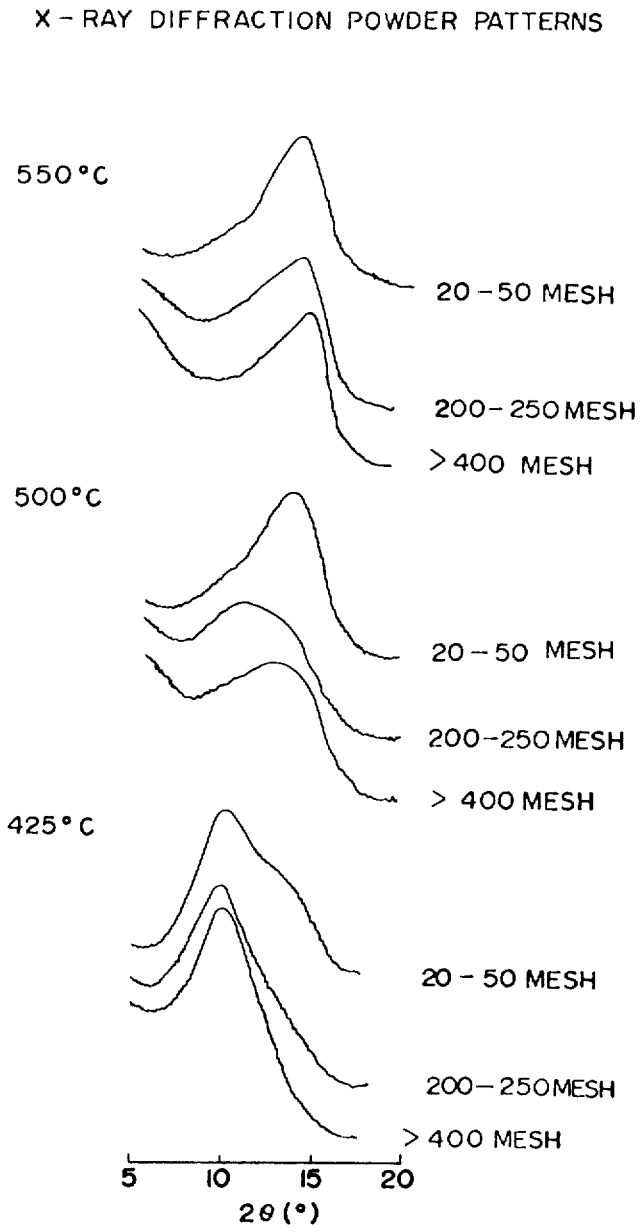
Figure 14:
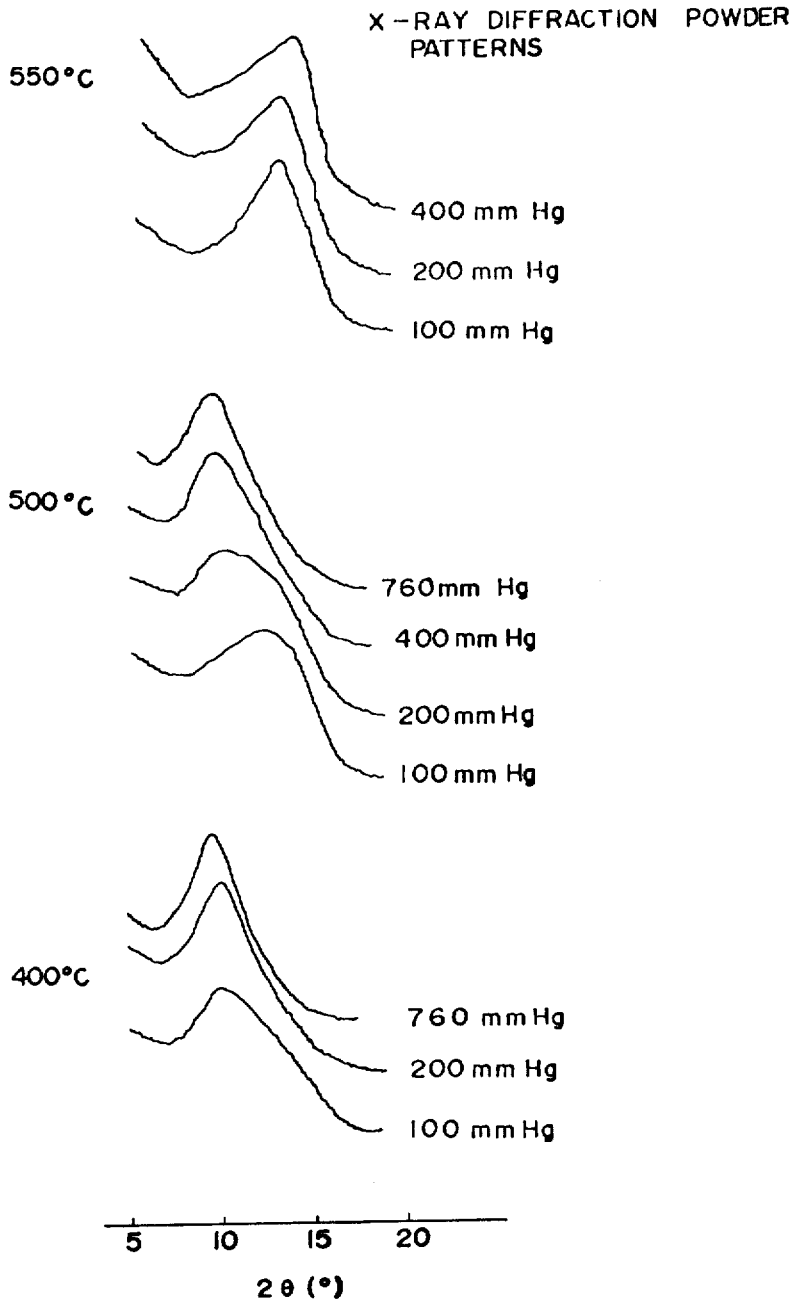
Figure 15:
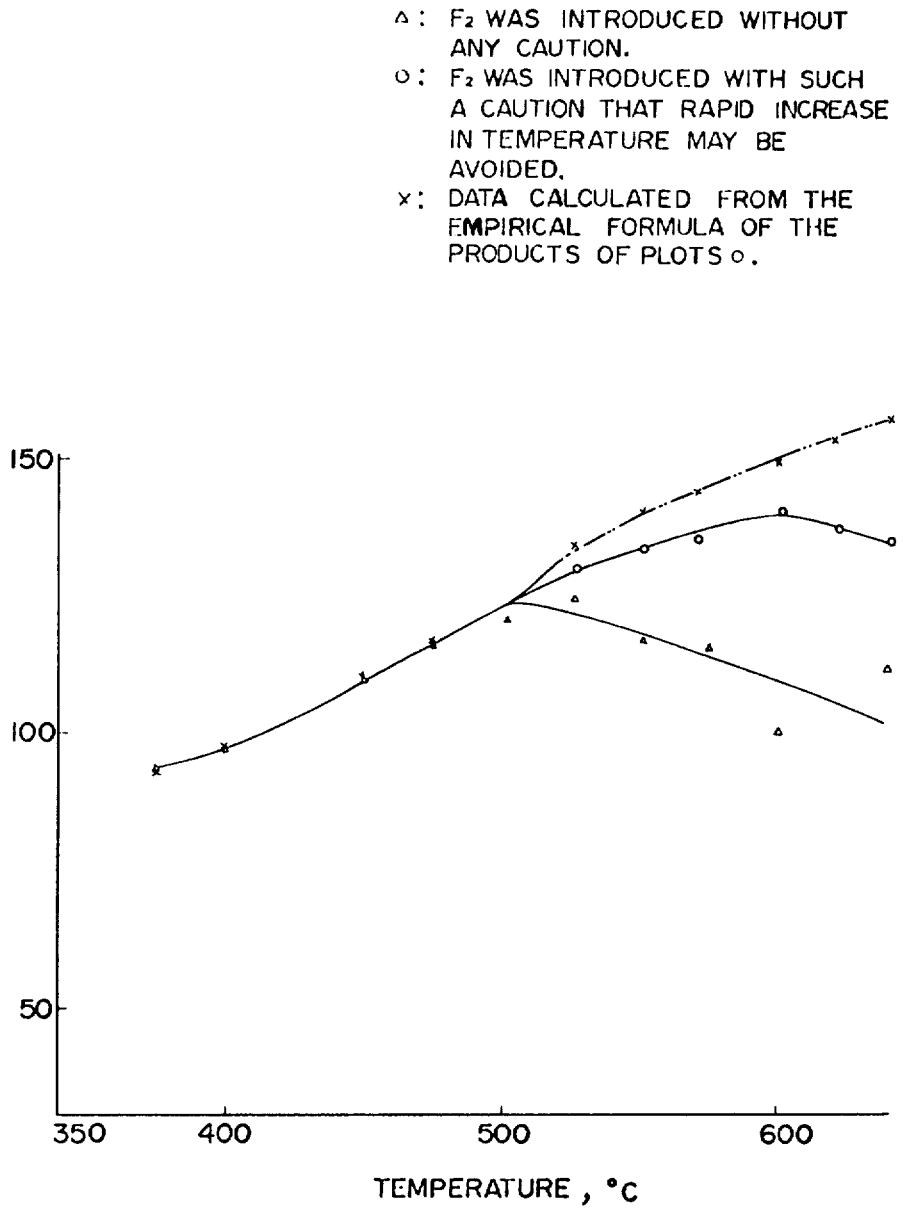
Figure 16:
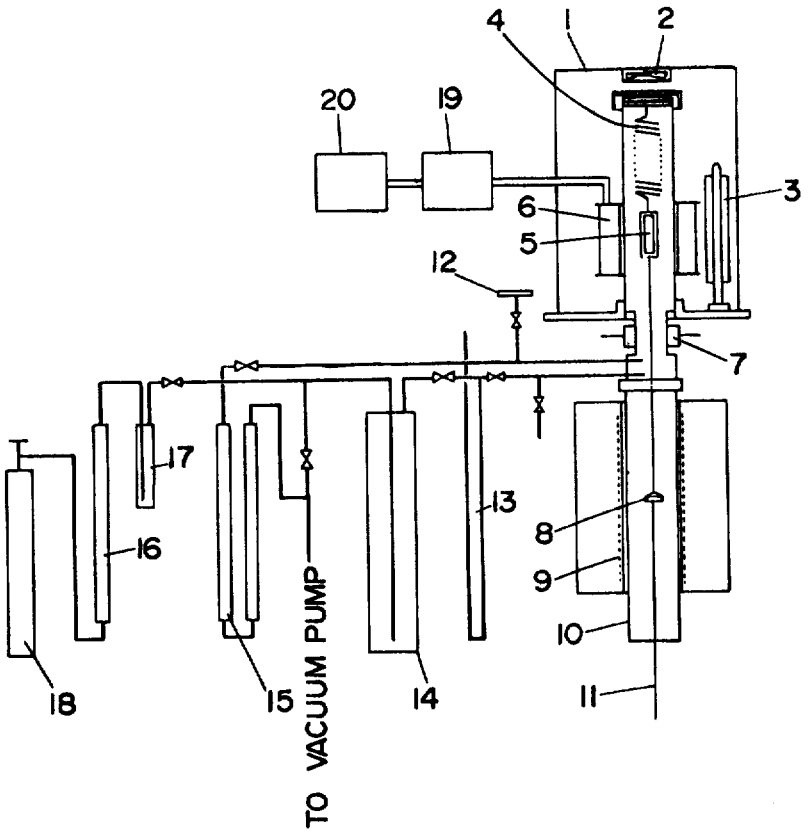

FIG. [13] *12* is a chart showing the DTA curves of the products respectively prepared by the reaction at 600° C. for 120 hrs. and the reaction at 375° C. for 120 hrs. and that of the sample obtained by heat-treating the latter at 600° C. for 120 hrs.;

FIG. [14] *13* shows the X-ray diffraction powder patterns of the products prepared using carbon materials with varied particle sizes, the patterns being shown in groups according to the reaction temperature employed;

FIG. [15] *14* shows the X-ray diffraction powder patterns of the products prepared employing varied fluorine gas pressures, the patterns being shown in groups according to the reaction temperatures employed;

FIG. [16] *15* is a curve showing the weight increases of the products prepared at varied reaction temperatures, with the curve obtained by specially controlling the introduction of a fluorine gas as well as the curve obtained by calculation from the empirical formula of the product of the latter curve; and FIG. [17] *16* is a diagrammatic view of the apparatus specially designed for the preparation of the compounds according to the present invention as well as the compounds compared in the present invention. Essentially, according to the present invention, there is provided a chemical compound poly-dicarbon monofluoride represented by the formula $$(C_2F)_n$$

and having a crystalline structure in which a layer structure [as shown in FIG. 12 hereof] is stacked with an interlayer spacing of about 9.0 Å to form a packing structure.

Figure 1:
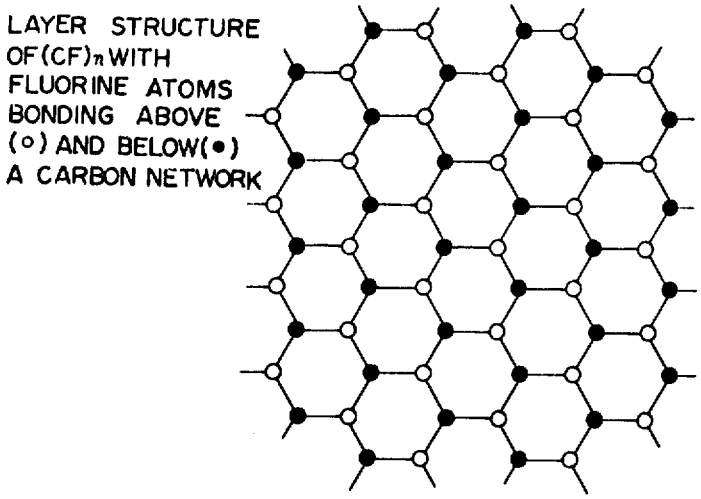
FIG. 1 is a diagram showing a layer structure of a conventional compound $(CF)_n$.

Referring now to FIG. 1, there is illustrated a diagram showing a layer structure of a conventional compound $(CF)_n$ in which ○ and ● show fluorine atoms respectively bonding above and below a carbon net work. In $(CF)_n$, the layer structure as shown in FIG. 1 is stacked with an interlayer spacing of about 5.8 A to form a crystalline structure of packing form.

Figure 2:
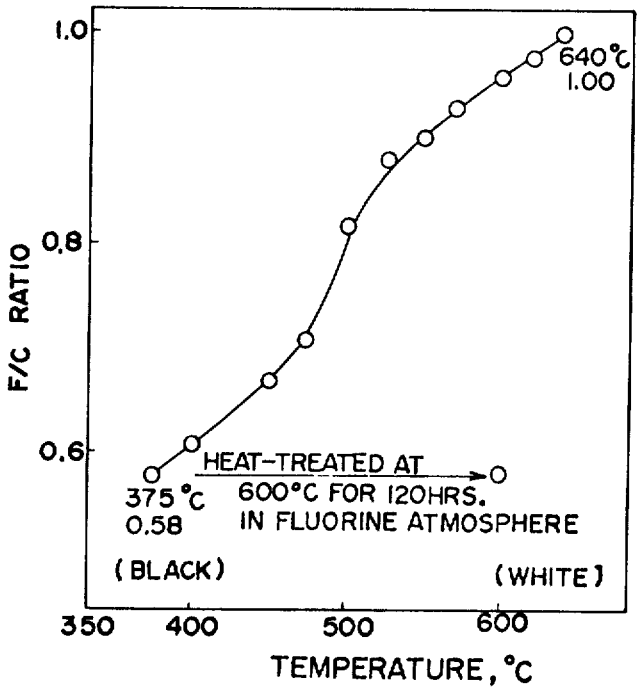
FIG. 2 is a graph showing the relationships between the reaction temperatures and the F/C ratios of the products.

In FIG. 2, there is illustrated a graph obtained by plotting F/C ratios of the product prepared by reacting natural graphite (produced in Madagascar and having a purity of more than 99%) having a sieve size of 200 to 250 mesh (Tyler) with fluorine under an $F_2$ pressure of 200 mmHG against the reaction temperatures employed. The following Table 1 corresponds to FIG. 2.

TABLE 1

Relationships between the reaction temperatures and F/C ratios of the products (empirical formulae) (Natural graphite, 200 to 250 mesh, $F_2$, 200 mmHg)

| Temperature, °C. | Reaction Time | Empirical formula |
|---|---|---|
| 375 | 120 hrs. | $CF_{0.58}$ |
| 400 | 50 hrs. | $CF_{0.61}$ |
| 450 | 10 hrs. | $CF_{0.67}$ |
| 450 | 70 hrs. | $CF_{0.67}$ |
| 475 | 5 hrs. | $CF_{0.71}$ |
| 475 | 50 hrs. | $CF_{0.72}$ |
| 500 | 150 min. | $CF_{0.82}$ |
| 525 | 100 min. | $CF_{0.88}$ |
| 550 | 50 min. | $CF_{0.90}$ |
| 570 | 40 min. | $CF_{0.93}$ |
| 570 | 120 hrs. | $CF_{0.93}$ |
| 600 | 20 min. | $CF_{0.96}$ |
| 600 | 140 hrs. | $CF_{0.97}$ |
| 640 | 5 hrs. | $CF_{1.00}$ |

As apparent from Table 1 and FIG. 2, the ratio of F/C gets nearer to 1 according to elevation of the reaction temperature. The product obtained at a relatively low temperature, for example, of 375° C. has an F/C ratio of 0.58 (namely, $CF_{0.58}$) and a black color. In this connection, it should be noted that once the product having such an F/C ratio of 0.58 formed, the F/C ratio unexpectedly no longer changes even if the product is further heat-treated at 600° C. for a period of time as long as 120 hrs. in a fluorine atmosphere. Only the color of the product changes from black to white.

Figure 3:
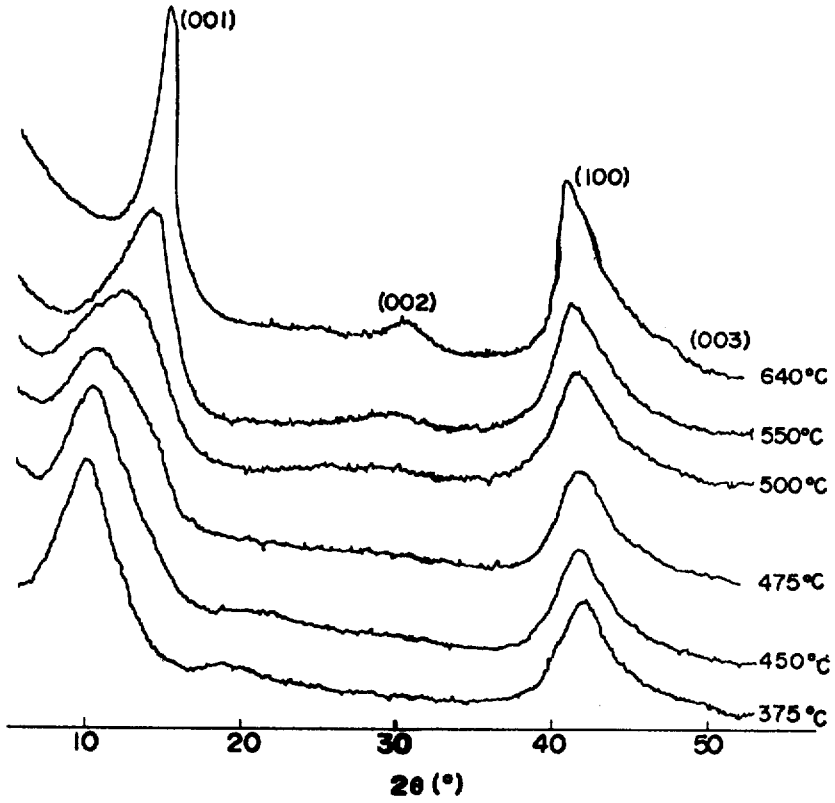
FIG. 3 shows the X-ray diffraction powder patterns of the products prepared at varied reaction temperatures.
Figure 4:
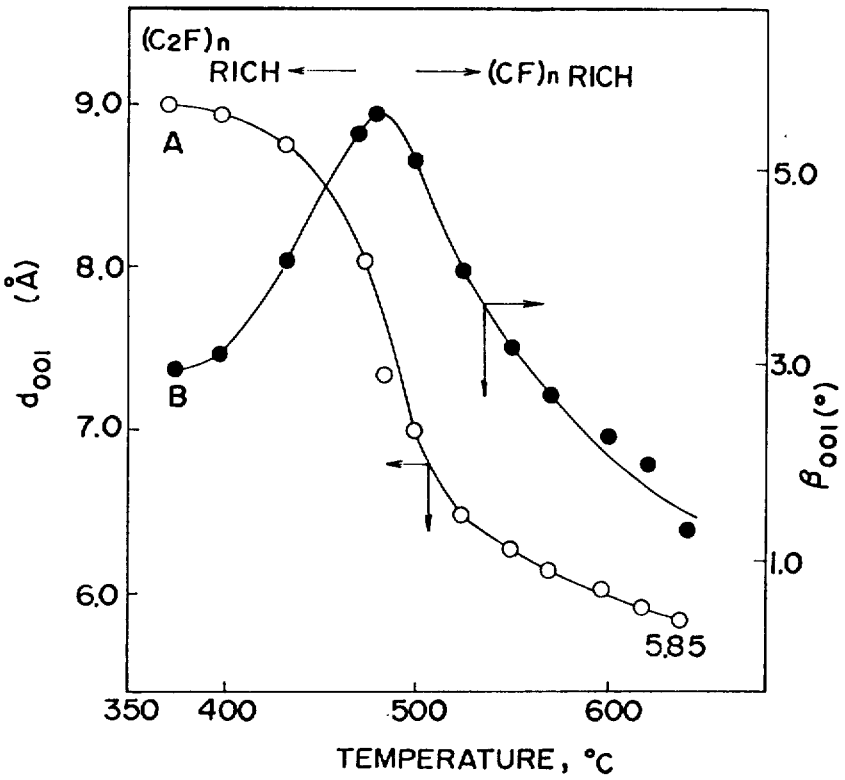
FIG. 4 is a graph in which based on the X-ray diffraction powder patterns, interlayer spacings ($d_{001}$) and half widths ($\beta_{001}$) of the products are plotted against the reaction temperatures.

In FIG. 3, there are shown X-ray diffraction powder patterns of the products obtained by the experiments for making Table 1 and FIG. 2. In FIG. 4, based on the X-ray diffraction powder patterns of FIG. 3, interlayer spacings ($D_{001}$) and half width ($\beta_{001}$) are plotted against the reaction temperatures. As clear from FIGS. 3 and 4, the position of the peak due to the diffraction (001) is shifted to the side of small angle of diffraction and the half width also changes according to lowering of the reaction temperature. The interlayer spacing of the product obtained by the reaction at 640° C. is 5.85 Å and corresponds to that of $(CF)_n$, while the interlayer spacing of the product obtained by the reaction at 375° C. is 9.0 Å. The products obtained by the reactions at the intermediate temperatures have varied interlayer spacings intermediate the range of 5,85 to 9.0 A. The half width of the diffraction (001) increases with elevation of the reaction temperature, shows maximum at a reaction temperature of about 480° C. and then decreases with further elevation of the reaction temperature. In the regions intermediate the reaction temperature range of 375° C. to 640° C., the formed products consists essentially of $C_2F$ stoichiometry and CF stoichiometry. When the (001) diffraction lines of the products obtained by the reactions at temperatures intermediate the range of 375° C. to 640° C. are corrected using a Lorentz's deviation factor, it becomes apparent that the diffraction lines respectively consist of the diffraction line of $(C_2F)_n$ having a peak at about 10° ($2\theta$) and that of $(CF)_n$ having a peak at 13.5° ($2\theta$).

Figure 5:
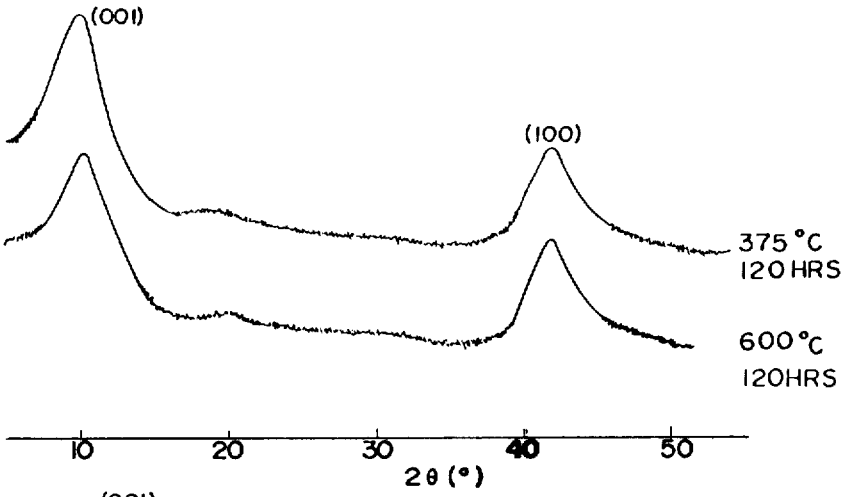
FIG. 5 is a chart showing the X-ray diffraction powder pattern of the product prepared by the reaction at 375° C. for 120 hrs. and that of after the heat treatment at 600° C. for 120 hrs.
Figure 6:
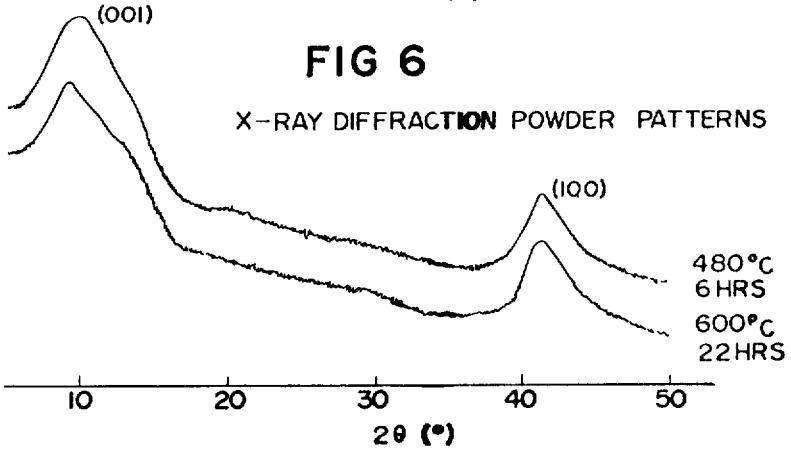
FIG. 6 is a chart showing the X-ray diffraction powder pattern of the product prepared by the reaction at 480° C. for 6 hrs. and that of after the heat treatment at 600° C. for 22 hrs.

Further studies have been made with a view to verifying the presence of a novel chemical compound polydicarbon monofluoride of the formula $(C_2F)_n$. The products respectively prepared by the reactions of natural graphite (the same material as mentioned before) with fluorine (200 mmHg) at 375° C. for 120 hrs. and at 480° C. for 6 hrs. were subjected to heat treatments of at 600° C. for 120 hrs. and at 600° C. for 22 hrs., respectively. As clearly shown in FIGS. 5 and 6, both the X-ray diffraction powder patterns substantially do not show any change even with the drastic heat treatments at such high temperatures for long periods.

Figure 7:
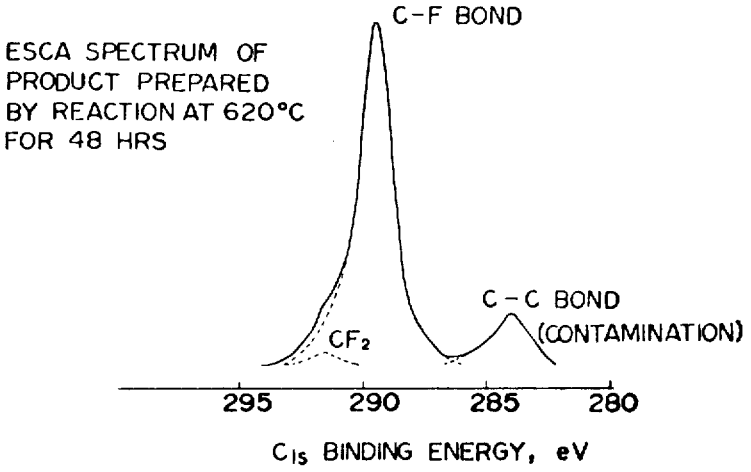
FIG. 7 is the ESCA spectrum of the product prepared by the reaction at 620° C. for 48 hrs.
Figure 8:
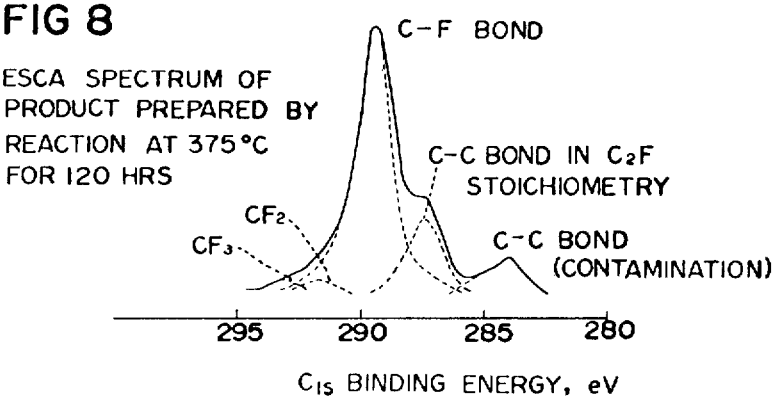
FIG. 8 is the ESCA spectrum of the product prepared by the reaction at 375° C. for 120 hrs.
Figure 9:
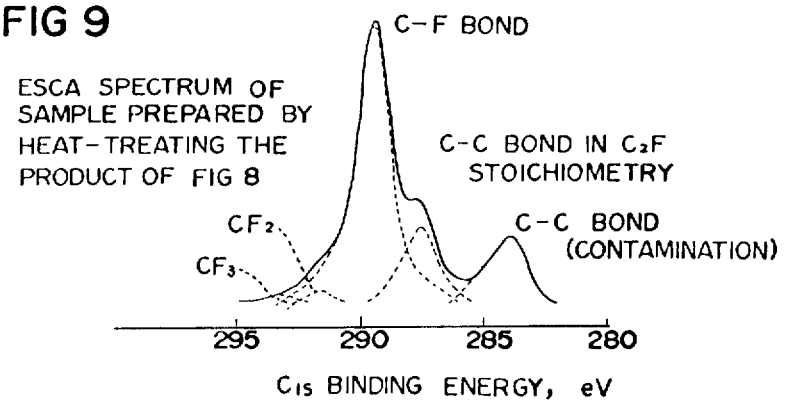
FIG. 9 is the ESCA spectrum of the sample obtained by heat-treating the product of FIG. 8.

ESCA (electronspectroscopy for chemical analysis) studies also have been made. The product $(CF)_n$ prepared by the reaction of natural graphite (the same material as mentioned before) with fluorine (200 mmHg) at 620° C. for 48 hrs. was examined by ESCA to give a spectrum as shown in FIG. 7. The spectrum in FIG. 7 has a peak due to the C—F bond in CF stoichiometry with a shoulder due to the peripheral $CF_2$ group and a small peak due to the C—C bond (contamination). On the other hand, the product $(C_2F)_n$ prepared by the reaction of natural graphite (the same material as mentioned before) with fluorine (200 mmHg) at 375° C. for 120 hrs. was examined by ESCA to give a spectrum as shown in FIG. 8. The spectrum in FIG. 8 has, in addition to a peak due to the C—F bond and a peak due to the C—bond (contamination), a shoulder due to the $CF_2$ and $CF_3$ groups and another distinguishing shoulder due to the C—C bond in $C_2F$ stoichiometry. The product examined in FIG. 8 was further heat-treated at 600° C. for 120 hrs. in a fluorine atmosphere. The so heat-treated product was examined again by ESCA to give a spectrum as shown in FIG. 9. As clear from FIGS. 8 and 9, there is substantially not any difference or change in profile of the spectrum. This fact clearly shows that the poly-dicarbon monofluoride, $(C_2F)_n$, prepared at a relatively low temperature is thermally stable and does not undergo any change in structure even by a further heat treatment under the drastic conditions.

Figure 10:
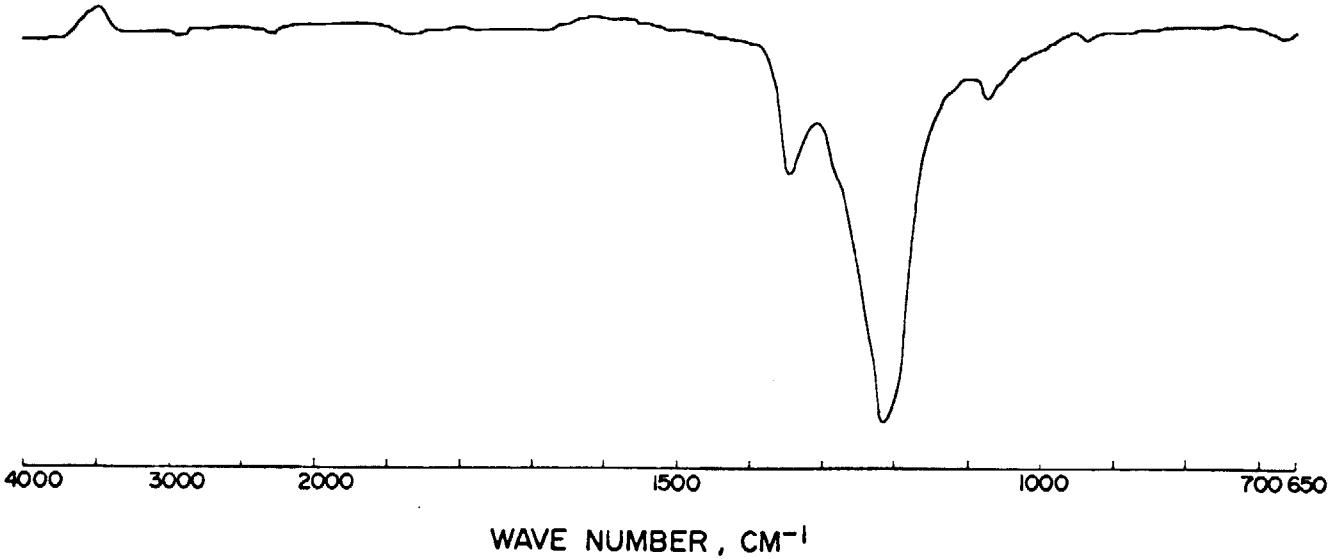
FIG. 10 is a chart showing the IR spectrum of the product prepared by the reaction at 620° C. for 48 hrs.
Figure 11:
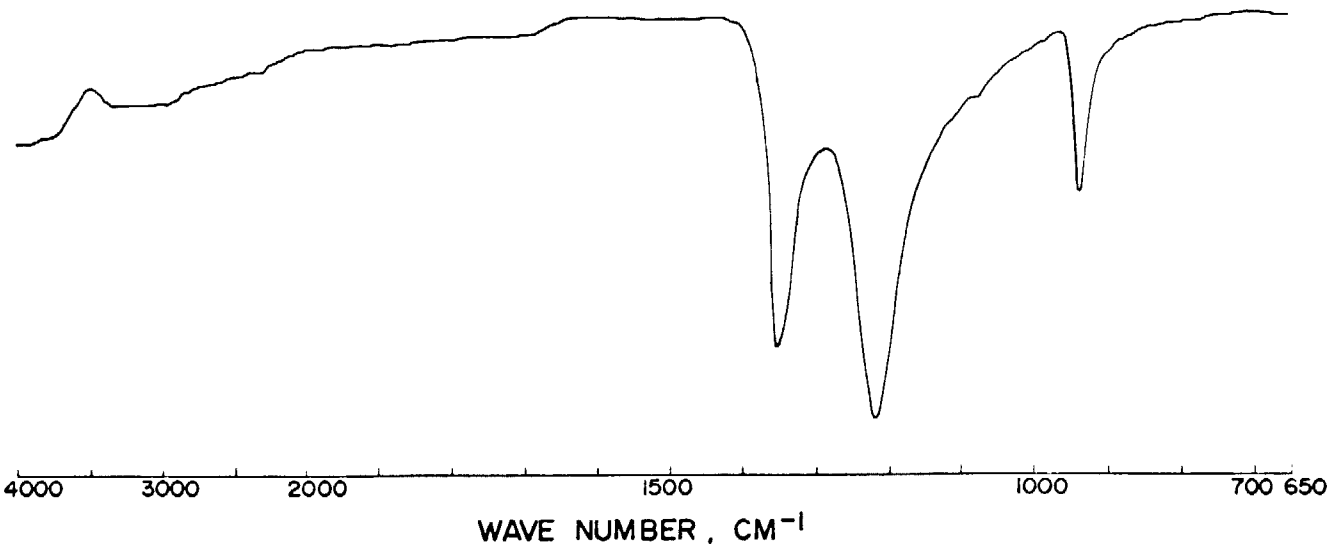
FIG. 11 is a chart showing the IR spectrum of the product prepared by the reaction at 375° C. for 120 hrs.

IR studies have been made with respect to $(CF)_n$ and $(C_2F)_n$ which have been prepared from the same natural graphite as mentioned before under the reaction conditions indicated in FIGS. 10 and 11. The obtained spectra of $(CF)_n$ and $(C_2F)_n$ are shown in FIGS. 10 and 11. There is a distinct difference between the spectrum of $(CF)_n$ and that $(C_2F)_n$.

From the facts as described, it has now been clearly affirmed that there is formed a completely novel compound, poly-dicarbon monofluoride represented by the formula $(C_2F)_n$ which is quite different in structure from $(CF)_n$. From the view point of stoichiometry, the fluorine content of $(C_2F)_n$ is apparently half that of $(CF)_n$. The color of $(C_2F)_n$ is black under the conditions for the formation thereof, and changes from black through grey to white with heat treatment of at elevated temperature of up to about 600° C. From the data of chemical analysis, X-ray diffraction powder pattern, ESCA spectrum, heat-treatment and IR spectrum, the structure of $(C_2F)_n$ has been determined. The poly-dicarbon monofluoride has a crystalline structure of packing form in which a layer structure [as shown in FIG. 12] is stacked with an interlayer spacing of about 9.0 Å. [In the layer structure of FIG. 12, ○ and ● show fluorine atoms respectively bonding above and below a carbon network. In the layer structure of $(C_2F)_n$, the carbon atoms partially form double bonds, $>C{=}C<$, whereas, in the layer structure of $(CF)_n$, all the carbon atoms form only single bonds,]

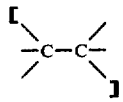

[The specific gravity of $(C_2F)_n$ is 1.5, whereas that of $(CF)_n$ is 2.7. The molecular weight of a monomer unit of $(C_2F)_n$ is 43, whereas that of $(CF)_n$ is 31. The C=C bond length is about 1.3 Å.] The C—F bond length and C—C bond length are about 1.35 Å and about 1.54 Å, respectively.

Properties and characteristics of $(C_2F)_n$ are as follows.

1. Heat of immersion:

A sample was prepared by reacting natural graphite (produced in Madagascar and having a purity of more than 99%) having a sieve size of 250 to 300 mesh (Tyler) with fluorine (1 atm.) at 375° C. for 144 hrs. The sample was black. The so obtained black was heat-treated in $F_2$ (200 mmHg) at 600° C. for 10 hrs. to obtain a heat-treated sample which was white.

Both the samples obtained above were measured with respect to heat of immersion.

The sample was put in a glass ampoule. Upon vaccum-bleeding air by treating the glass ampoule at 100° C. for 15 hrs. under a pressure of about $10^{-8}$ mmHg, the glass ampoule was sealed by melting. The sealed ampoule was subjected to measurement, employing a CM-502 Type conduction calorie meter (manufactured and sold by Oyo Kenkyusho, Japan) which was put in a constant temperature vessel having a capacity of about 1 $m^3$ and maintained at 25°±0.05° C. Illustratively stated, the glass ampoule was broken by a destroying bar, so that the sample was immersed in n-butyl alcohol (reagent grade) contained in a vessel. Heat generated at that time was measured. In that instance, the heat generated by the breakage of ampoule and by the stirring conducted after the breakage was compensated because the apparatus was of a twin type and negligible. The deviation of measured values was less than ±10%.

Results:

Black sample—55 ergs/cm$^2$

White sample—53 ergs/cm$^2$

For comparison, the heat of immersion of $(CF)_n$ obtained by the reaction of at 600° C. for 120 hrs. in $F_2$ (200 mmHg) was −36 ergs/cm$^2$, and that of TEFLON (trade name of polytetrafluoroethylene manufactured and sold by Du Pont Co., U.S.A.) is −56 ergs/cm$^2$.

From the above results, $(C_2F)_n$ has excellent properties in wetting resistance, stain resistance, water repellency, release characteristics, etc. The wetting resistance of $(C_2F)_n$ is a lower than that of $(CF)_n$ but such a lower wetting resistance can give rather better results when $(C_2F)_n$ is employed as a cathode material in high-energy primary cells.

2. Thermal decomposition temperature:

A sample was prepared by reacting natural graphite (produced in Madagascar and having a purity of more than 99%) having a sieve size of 200 to 250 mesh (Tyler) with fluorine (200 mmHg) at 375° C. for 120 hrs. The sample was black. The so obtained black was heat-treated in $F_2$ (200 mmHg) at 600° C. for 120 hrs. to obtain a heat-treated sample which was white.

Both the samples obtained above were measured with respect to thermal decomposition temperature, using DTA (differential thermal analysis) method.

In the DTA method, a DTA apparatus of DT-20B type (manufactured and sold by Shimazu Seisakusho, Japan) was used. Using $\alpha$-$Al_2O_3$ as a standard sample, 5.0 mg. of the sample was measured, with respect to thermal decomposition temperature, in an atmosphere of argon (atomospheric pressure) at a heating rate of 10° C./min. The results are shown in FIG. [13] *12*, with DTA curve obtained with respect to the $(CF)_n$ prepared by the reaction of at 600° C. for 120 hrs. in $F_2$ (200 mmHg).

As can be seen from the DTA curves, the thermal decomposition temperature of the $(C_2F)_n$ prepared by the reaction of at 375° C. for 120 hrs. (having low crystallinity) is 490° C. in an atmosphere of argon. When such low crystallinity $(C_2F)_n$ is heat-treated at 600° C. for 120 hrs., it comes to have the highest crystallinity, so that it has a thermal decomposition temperature of 570° C. in an atmosphere of argon.

For comparison, the thermal decomposition temperature of the $(CF)_n$ prepared by the fluorination reaction of the same natural graphite as mentioned above at 600° C. for 120 hrs. in $F_2$ (200 MmHg) is 605° C. in an atmosphere of argon. The $(CF)_n$ prepared under such reaction conditions has the highest crystallinity.

3. Specific resistance:

Specific resistance of $(C_2F)_n$ (the same black and white samples as those obtained in item 2 above): $>10^8\Omega$/cm For comparison, specific resistance of $(CF)_n$ (the same as that obtained in item 2 above): $>10^8\Omega$/cm 4. BET surface area (according to $N_2$ method):

Black $(C_2F)_n$ (the same as that obtained in item 1 above): 28 m$^2$/g.

White $(C_2F)_n$ (the same as that obtained in item 1 above): 117 m$^2$/g.

For comparison, white $(CF)_n$ (the same as that obtained in item 1 above): 122 m$^2$/g.

5. Infrared spectrum characteristics:

With respect to the black $(C_2F)_n$ (the same as that obtained in item 2 above), the absorption due to a C—F stretching vibration is observed at a wave number of 1,221 cm$^{-1}$, and with respect to the white $(C_2F)_n$ obtained by heat-treating the above black $(C_2F)_n$ at 600° C. for 120 hrs. in $F_2$ (200 mmHg) also, the absorption due to a C—F stretching vibration is observed at the same wave number, namely at 1,221 cm$^{-1}$. For comparison, with respect to the white $(CF)_n$ (the same as that obtained in item 2 above), the absorption due to a C—F stretching vibration is observed at 1,219 cm$^{-1}$. It is apparently clear that $(C_2F)_n$ is quite different in structure from $(CF)_n$.

6. Color:

The novel chemical compound $(C_2F)_n$ is obtained at a temperature of 300° to 500° C. The color of the so formed product is black, but, upon heat treatment, changes through grey at about 550° C. to white at about 600° C.

In another aspect of the present invention, there is provided a process for preparing a chemical compound poly-dicarbon monofluoride comprising reacting a particulate carbon material having Franklin's P-value of about 0 to about 0.6 with fluorine at a temperature of 300° to 500° C. until complete fluorination of the particulate carbon material is accomplished.

In the fluorination reaction of a particulate carbon material, the reaction temperature range of from 300° to 500° C. is most important and critical for obtaining poly-dicarbon monofluoride, namely $(C_2F)_n$. When the reaction temperature is lower than 300° C., the reaction does not proceed. On the other hand, if the reaction temperature is higher than 500° C., formation of $(CF)_n$ preferentially proceeds, so that the amount of $(C_2F)_n$ formed is small. In addition, as will be detailedly explained later, with a reaction temperature of higher than 500° C., the formed product is liable to easily decompose, leading to considerable decrease in yield.

The crystallinity of a particulate carbon material to be employed as a raw material also is critical for obtaining $(C_2F)_n$. The crystallinity of a carbon material can be expressed in terms of Franklin's P-value. The Franklin's P-value is defined by the formula $$d_{(002)} = 3.440 - 0.086(1 - P^2)$$

wherein $d_{(002)}$ is an interlayer spacing of (002) [R. E. Franklin: Proc. Roy. Soc. A 209, 196 (1951)]. For obtaining $(C_2F)_n$, the Franklin's P-value of the carbon material should be in the range of from 0 to 0.6. The carbon material having a Franklin's P-value of 0 is completely crystalline, and the representative example is natural graphite from Madagascar ores. When the carbon material having a Franklin's P-value of more than 0.6, the formation reaction of $(CF)_n$ rapidly proceeds and there is formed no $(C_2F)_n$. As stated above, the natural graphite may most preferably be employed for obtaining $(C_2F)_n$. Besides, there may also preferably be employed graphitizing carbon materials having a Franklin's P-value of 0.6 or less, for example, petroleum cokes which have been heat-treated at about 2,000° to about 3,000° C., for about 10 to about 120 minutes in a graphitizing furnace. In this connection, it is noted that when such graphitizing carbon materials as petroleum cokes are employed, the products tend to have a relatively much amount of peripheral $CF_2$ groups and $CF_3$ groups since the particle size of petroleum coke is relatively small.

The reaction period of time is not critical. For obtaining $(C_2F)_n$ according to the present invention, it is essential that the reaction of a particulate carbon material with fluorine is conducted until complete fluorination of the particulate carbon material is accomplished, that is, until further heating of the product in an atmosphere of fluorine gas does not cause increase in the fluorine content of the product any more. The time required for the complete fluorination of a particulate carbon material varies depending on the reaction temperature, crystallinity of a carbon material, particle size of a carbon material and pressure of a fluorine atmosphere, but, generally, may be 10 minutes to 150 hours. If fluorination of the particulate carbon material is not complete, the products naturally contain unreacted carbon material. In this connection, it is noted that in view of the reaction temperatures and reaction periods of time employed by W. Rudorff et al. [Z. Anorg, Chem. 253, 283-296 (1941)] or by J. L. Margrave [J. Chem. Soc. Dalton P. 1268-1273 (1974)], those products $(CF_x)$ wherein $x<1.0$ are believed to contain unreacted carbon material.

The particle size of a particulate carbon material also is not critical. However, if the particle size is too large, extremely long reaction time is needed for complete fluordination of the particulate carbon material. While, if the particle size is too small, the $(CF)_n$ formation reaction tends to preferentially proceed, resulting in decrease of the $(C_2F)_n$ content of the product. In general, the particle size of particulate carbon material may preferably be in the range of from [20 to 100μ,] *1 to 150μ* more preferably in the range of 20 to 100μ and most preferably in the range of 30 to 80μ. In FIG. [14] *13*, there are shown X-ray diffraction powder patterns of the products prepared using carbon materials with varied particle sizes, the patterns being shown in groups according to the reaction temperatures employed. The reaction conditions and the F/C ratios of the products of FIG. [14] *13* are shown in Table 2.

TABLE 2

Relationships between the particle size and F/C ratio of the products (empirical formula) (Natural graphite; $F_2$, 200 mmHg)

| Particle size, mesh | Reaction temperature, °C. | Reaction Time, hrs. | Empirical formula |
|---|---|---|---|
| >400 | 425 | 48 | $CF_{0.67}$ |
| 200-250 | 425 | 65 | $CF_{0.68}$ |
| [*]20-50 | 425 | 163 | $CF_{0.69}$ |
| >400 | 500 | 13 | $CF_{0.77}$ |
| 200-250 | 500 | 14 | $CF_{0.78}$ |
| [*]20-50 | 500 | 45 | $CF_{0.81}$ |
| >400 | 550 | 3 | $CF_{0.91}$ |
| *200-250 | 550 | 4 | $CF_{0.90}$ |
| *20-50 | 550 | 17 | $CF_{0.88}$ |

*Comparative example

As can be seen the Table 2 and FIG. [14] *13*, the smaller the particle size, the more the $(C_2F)_n$ content of the product is. However, when the particle size is too small, for example less than the sieve size of 400 mesh (Tyler), violent reactions including those of information of $(CF)_n$ and decomposition of the products tend to occur, resulting rather in decrease in the $(C_2F)_n$ content of the product. When the reaction is conducted at 425° C. for 163 hrs., the product having a high $(C_2F)_n$ content is obtained even from a carbon material having a particle size as large as 20 to 40 mesh, but the required reaction time is disadvantageously long. In FIG. [14] *13*, the peak due to $(C_2F)_n$ is at 10° (2 θ) and that due to $(CF)_n$ is at 13.5° (2 θ).

The pressure of fluorine gas also is not critical. Generally, it can be said that although the higher the fluorine pressure, the larger the $(C_2F)_n$ content of the product is, a reaction vessel resistible to a very high pressure fluorine atmosphere at temperatures employed is not available. Usually, as a material for a reaction vessel, nickel or such a nickel alloy as Monel metal is most suitably used. For this reason, the range of fluorine gas pressure is advantageously 50 mmHg to 1.5 atm. In FIG. [15] *14*, there are shown X-ray diffraction powder patterns of the products prepared employing varied fluorine gas pressures, the patterns being shown in groups according to the reaction temperatures employed. The reaction conditions and the F/C ratios of the products are shown in Table 3.

TABLE 3

Relationships between the fluorine gas pressure and F/C ratio of the products (empirical formula) (Natural graphite, 200 to 250 mesh)

| Reaction temperature, °C. | Fluorine pressure, mmHg | Reaction time, hrs. | Empirical formula |
|---|---|---|---|
| 400 | 100 | 55 | $CF_{0.64}$ |
| 400 | 200 | 50 | $CF_{0.63}$ |
| 400 | 760 | 48 | $CF_{0.62}$ |
| 500 | 100 | 20 | $CF_{0.78}$ |
| 500 | 200 | 19 | $CF_{0.73}$ |
| 500 | 400 | 19 | $CF_{0.73}$ |
| 500 | 760 | 19 | $CF_{0.67}$ |
| *550 | 100 | 3 | $CF_{0.90}$ |
| *550 | 200 | 3 | $CF_{0.91}$ |
| *550 | 400 | 3 | $CF_{0.90}$ |

*Comparative example

As can be seen from Table 3 and FIG. [15] *14*, at a reaction temperature of 500° C. which is critical upper point according to the present invention, the influence of fluorine pressure on the $(C_2F)_n$ content of the product is clearly observed, that is, the higher the fluorine pressure, the more the $(C_2F)_n$ content of the product is. The product formed under 760 mmHg ($F_2$) is substantially $(C_2F)_n$, whereas the products formed under 100, 200 and 400 mmHg are compositions consisting essentially of $C_2F$ stoichiometry and CF stoichiometry. Whilst, at such a relatively low reaction temperature as 400° C., there is not observed any appreciable difference in the $(C_2F)_n$ content according to the change of fluorine pressure. This is so because the products formed at such low temperature are all substantially $(C_2F)_n$ and chemically stable even under varied fluorine pressures. By contrast, the products formed by the reactions of at such a high temperature as 550° C. under fluorine pressures in the range of from 100 to 400 mmHg are all substantially $(CF)_n$, but the rate of the reaction of at such high temperature under such a higher fluorine pressure as 760 mmHg is extremely large and hence, large quantity of heat is generated, thereby causing the product $(CF)_n$ to decompose to amorphous carbon and gaseous fluorocarbons such as $CF_4$ (mainly), $C_2F_6$, $C_2F_4$, $C_3F_8$, $C_4F_{10}$, etc. Further, due to the decomposition of the products, heat is generated to accelerate decomposition of the product and, at the same time, the so formed gaseous fluorocarbons prevent fluorination reaction, so that under such conditions there is only obtained a product having an empirical formula $(CF_{0.83})_n$ of a complicated structure in low yield. As described above, since the preparation of $(CF)_n$ under a high fluorine pressure encounters such a fatal disadvantage as decomposition of the products, the $(CF)_n$ formation reaction is usually conducted in a mixed atmosphere of fluorine gas and an inert gas such as nitrogen gas in order to reduce a partial pressure of fluorine in the reaction system. By contrast, in preparing $(C_2F)_n$ according to the present invention, the reaction is conducted at a temperature of 500° C. or less and hence, the reaction can be simply conducted in an atmosphere of only fluorine gas. The practically preferred pressure is 760 mmHg.

Referring to FIG. [16] *15*, there is illustrated a curve showing the weight increases of the products prepared at varied reaction temperatures, with the curve obtained by specially controlling the introduction of a fluorine gas as well as the curve obtained by calculation from the empirical formula of the products. The ordinate of the graph in FIG. 1 indicates a weight increase (% by weight) relative to the carbon material. Illustratively stated, in the graph, the points Δ show the data obtained by the fluorination process in which fluorine gas is introduced without any caution so that the fluorine pressure is rapidly elevated to a desired level. The points ○ show the data obtained by the fluorination process in which fluorine gas is gradually introduced with such a caution or control that rapid increase in temperature may be avoided. The points x are the data obtained by calculation from the empirical formula of the products of the points ○ and showing imaginary values of weight increases which would be obtained if all the carbon material employed is converted to the compound of the empirical formula of the points ○. In the experiments for making the graph in FIG. [16] *15*, natural graphite of 200 to 250 mesh size was employed and the reaction was batchwise conducted in $F_2$ (200 mmHg) at indicated temperatures for such a time as indicated in Table 1.

As can be seen from FIG. [16] *15*, in the fluorination process in which the reaction is conducted at a temperature of 500° C. or less, the points ○ are in coincidence with the points x. This fact clearly shows that the products prepared by the reaction of at a temperature of 500° C. or less are obtained in a yield of 100% in relation to the carbon material employed. In addition, since the reactions of at such low temperatures can be conducted in a closed system or batch system without any decomposition of the products, the products are obtained surprisingly in a yield of 100% in relation of the employed fluorine gas also. By contrast, when the reaction is conducted at a temperature of higher than 500° C., the products decompose at a high rate and the rate of decomposition rapidly increases according to elevation of the reaction temperature. Hence, the yield of the products (the $(CF)_n$ content of the product is more than 50 mole % but the structure of the product is complicated and not exactly known as explained in relation to FIG. [15] *14*) is extremely low.

As described, according to the process of the present invention, there are obtained products having varied $(C_2F)_n$ contents. However, as opposed to the conventional $(CF_x)_n$ wherein $x<1$, the product obtained by the process of the present invention is featured by the absence of unreacted carbon and the presence of a novel chemical compound polydicarbon monofluoride of the formula $(C_2F)_n$ substantially in an amount of more than 50 mole %. The $(C_2F)_n$ content of the product cannot be exactly 100%, since the product obtained by the process of the present invention always carries $CF_2$ groups and $CF_3$ groups in the outermost surface regions of the particles of the product. As different from the product obtained by the process of the present invention, when the fluorination reaction of a carbon material is conducted at a temperature of more than 500° C., all of the peripheral $CF_3$ groups are thermally decomposed to gaseous $CF_4$. Accordingly, the product obtained by the process of the present invention is also characterized by the presence of peripheral $CF_3$ groups. If the presence of peripheral $CF_2$ groups and $CF_3$ groups is neglected, the product obtained by the process of the present invention theoretically has the formula $(CF_x)_n$ wherein $x=0.5$ to 0.75. However, the actually obtained products generally have the formula $(CF_x)_n$ wherein $x=$about 0.58 to about 0.82 due to the peripheral $CF_2$ groups and $CF_3$ groups. Especially when the heat-treated petroleum coke is employed as a carbon material, the value of x is increased since the particle thereof has a very small size and hence, the product, as a whole, has a large surface area with the peripheral $CF_2$ groups and $CF_3$ groups attached thereto. The remaining moiety (other than $(C_2F)_n$, $CF_2$ groups and $CF_3$ groups) of the product obtained by the process of the present invention, if any, is $(CF)_n$.

The optimum temperature conditions for obtaining the product according to the present invention slightly varies according to crystallinity of the carbon material to be employed. When the Franklin's P-value is 0 to about 0.10, the optimum reaction temperature is 350° to 500° C. When the Franklin's P-value is about 0.11 to 0.45, the optimum reaction temperature is 320° to 450° C. When the Franklin's P-value is about 0.46 to 0.60, the optimum reaction temperature is 300° to 420° C. As aforementioned, the reaction time varies depending on the reaction temperature etc. Generally, for example, when the reaction temperature is about 350° C., the reaction time may preferably be in the range of from 50 to 150 hrs. When the reaction is conducted at about 500° C., the reaction time may suitably be 10 to 100 minutes.

In order to selectively obtain a poly-dicarbon fluoride of the formula $(C_2F)_n$, the reaction temperature is further limited and varies according to the Franklin's P-value of the carbon material to be employed. When the Franklin's P-value is 0 to about 0.10, the reaction temperature may preferably be 350° to 400° C. When the Franklin's P-value is about 0.11 to about 0.45, the reaction temperature may preferably be 320° to 360° C. When the Franklin's P-value is about 0.46 to about 0.6, the reaction temperature may preferably be 300° to 340° C.

In still another aspect of the present invention, there is provided a polycarbon fluoride composition consisting essentially of $C_2F$ stoichiometry and CF stoichiometry, the content of $C_2F$ stoichiometry being more than 50 mole %, based on the composition.

Referring now back to FIG. [16] *15*, as detailedly explained before, when the fluorination reaction of a particulate carbon material is conducted at a temperature of 500° C. or less, the product can be obtained in a yield as large as 100% with respect to not only the carbon material but also the fluorine. Such composition does not contain any unreacted carbon material. Properties and characteristics are comparable to $(C_2F)_n$ and $(CF)_n$. As explained before, the reaction for selectively obtaining a compound $(CF)_n$ or a $(CF)_n$ rich composition is conducted at a temperature of more than 500° C. to 640° C. As clearly seen from FIG. [16] *15*, the yield is suddenly and sharply decreased, with the boundary point at 500° C. Generally, the yield of $(CF)_n$ is extremely poor. According to the present invention, it has unexpectedly and surprisingly been found that the yield of the CF stoichiometry moiety of the $(C_2F)_n$ rich product obtained by the reaction of at a temperature of 500° C. or less is 100% with respect to not only the carbon material but also the fluorine. The decomposition of the product does not occur at all. Accordingly, the reaction can be conducted in a closed system or a batch system. Further, the fluorine content of such composition is less than that of $(CF)_n$. The production cost is extremely reduced as compared with that for $(CF)_n$. Such composition of the present invention is extremely useful economically and practically.

In a further aspect of the present invention, there is provided a process for preparing a chemical compound polydicarbon monofluoride comprising reacting a particulate carbon material having Franklin's P-value of about 0 to about 0.6 with fluorine at a temperature of 300° to 500° C. until complete fluorination of the particulate carbon material is accomplished and heating the resulting product at a temperatue of about 50° C. higher than the reaction temperature for formation of the product to 600° C. for 5 to 10 hours in an atmosphere of fluorine gas under an $F_2$ pressure of at least 50 mmHg to increase crystallinity of said product. As described before, the product obtained by the fluorination reaction of natural graphite at a temperature of 500° C. or less has a low crystallinity and a black color. But, only by heating such low crystallinity product in a fluorine atmosphere, the crystallinity of the product can be easily increased to have various increased crystallinities according to the temperature of heat treatment. The heat treatment period of time is not critical, but in general the heat treatment for 5 to 10 hours is sufficient for increasing crystallinity to a desired level. The increase of crystallinity depends on the temperature employed. There may be employed a temperature of about 50° C. higher than the fluorination reaction temperature to 600° C. The fluorine pressure is not critical but a pressure of at least 50 mmHg is sufficient. Too high a pressure is not preferred from the view point of chemical engineering since the high pressure of fluorine gas is hazardous and causes the reactor to be corroded. At most, 1.5 atm may be employed. 760 mmHg is most preferred. Usually, the crystallinity, can be determined by color of the product. With the increase of crystallinity, the color changes through grey at white. For example, when natural graphite is employed, the color of the product changes through grey at about 550° C. to white at about 600° C. By such heat treatment, only the crystallinity of the product is increased without any change in the F/C ratio of the product. Most suitable crystallinity is variable according to the use. For example, a relatively low crystallinity is advantageous for the use of a cathode material in high energy primary cells, while a high crystallinity is desired for the use of a lubricant.

This invention will now be described in more detail by reference to the following examples that by no means limit the scope of this invention.

In the examples, the practicle size is expressed in mesh (Tyler). Therefore, the relationships of mesh and $\mu$ is shown below.

$>400$ mesh: $<37\mu$
200–250 mesh: $62–74\mu$
20–50 mesh: $279–840\mu$

EXAMPLE 1

For preparing a compound of the present invention, there was used an apparatus specially designed so that it may be resistant to a corrosive fluorine atmosphere. The apparatus is diagrammatically shown in FIG. [17] *16*. In FIG. [17] *16*, numeral 1* designates an air bath controlled at 45° C., numeral 2* a fan, numeral 3* a heater, numeral 4* a nickel spring, numeral 5* a Teflon-coated ferrite core, numeral 6* a differential transformer, numeral 7* a jacket for cooling water, numeral 8* a sample pan (outer diameter:12 mm, height:5 mm) made of Monel metal, numeral 9* a furnace, numeral 10* a nickel reactor, numeral 11* a thermocouple sheath, numeral 12* a Geissler tube, numeral 13* a Hg magnometer, numeral 14* a gas mixing vessel, numeral 15* a soda-line bed, numeral 16* a NaF bed, numeral 17* a cold trap, numeral 18* a fluorine gas bomb, numeral 19* a linear amplifier and numeral 20* a recorder. A weight sensitive portion is of a spring balance type. The spring 4* is adapted to expand and contract according to the change of weight of the sample, and the expansion and contraction of the spring 4* is detected by the differential transformer 6*. The apparatus was made at its high temperature portions of nickel and Monel metal and at its ambient temperature portions of trifluorochloroethylene resin, copper and stainless steel. The spring 4* was made of a nickel wire of 0.3 mm$\phi$ and had a spring diameter of 10 mm, a number of turn of 40, a maximum load of 5 g and an expansion of 10 mm/g. The reaction temperature was measured at a portion spaced from the sample pan 8* by 0.5 mm, using the thermocouple (alumelchromel) inserted into the reactor 10 at the bottom thereof. The reaction temperature was controlled with a tolerance of $\pm 0.5°$ C.

25 mg of Madagascar-produced natural graphite (purity obtained by ash measurement: more than 99%) of a sieve size of 200 to 250 mesh was taken into the sample pan 8 and thinly spread. Fluorine gas contained in the bomb 18 and having a purity of 98% was employed. The HF contained as an impurity in the fluorine gas was completely removed by passing the fluorine gas through the cold trap 17 cooled at $-78°$ C. and a bed 6 packed with NaF (the exhaust gas was removed by passing the gas through the soda-lime bed 15.).

The natural graphite taken in the sample pan was heated in vacuum (under less than $10^{-2}$ mmHg) for about 2 hrs. to remove a moisture content contained in the graphite. Fluorine gas was introduced into the reactor. The reaction was allowed to proceed at 375° C. for 120 hrs. while maintaining the fluorine pressure at 200 mmHg. There was obtained a powder product having a black color. The yield was 100% with respect to the natural graphite employed.

The fluorine content of the product was measured as follows. The product was burnt according to the oxygen flask combustion method and the fluorine was absorbed into water as hydrogen fluoride. The amount of fluorine was determined by employing a fluorine ion electrode. From the result, there was obtained an empirical formula $(CF_{0.58})_n$. ESCA spectrum of the product was obtained using an ESCA apparatus of 650-B type (manufactured and sold by DuPont Co., U.S.A.). The spectrum is shown in FIG. 8. From the ESCA spectrum, the fluorine fraction of 0.08 is apparently due to the $CF_2$ groups and $CF_3$ groups formed in the outermost surface regions of the particles of products. It has been fairly concluded the product is substantially of a structure of the formula $(C_2F)_n$. The product was then further heated in a fluorine atmosphere at 600° C. for 120 hrs. The product changed in color from black to white but did not change in its structure.

The product was examined by X-ray diffractiometry to give the X-ray diffraction powder pattern as shown in FIG. 2. The apparatus for X-ray diffractiometry is that of JDX-8F type (manufactured and sold by Nihon Denshi Sha, Japan). As the X-ray, $CuK_\alpha$ line obtained by removing $K_\beta$ line using a Ni filter. The measuring conditions were as follows.

| | |
|---|---|
| Tube voltage-current | 35 kV-10 mA |
| Scanning speed of goniometer | 1°/min. |
| Slit | 1°-1°-0.10 mm |
| Recorder | time constant of 1 sec. recording paper speed of 1 cm/min. |

EXAMPLE 2

The substantially same procedures as described in Example 1 were repeated, except that the reaction was conducted in a fluorine pressure of 760 mmHg at 500° C. for 20 hrs. There was obtained a black product of $(CF_{0.76})_n$. The black product was heat-treated in $F_2$ (200 mmHg) at 600° C. for 6 hrs. The product changed in color from black to white, but did not change in its structure.

COMPARATIVE EXAMPLE 1 AND EXAMPLE 3

The substantially same procedures as described in Example 1 were repeated, except that the reaction temperature and time were varied. The reaction conditions and the results are shown below.

| | Temperature, °C. | Time, hrs. | Empirical formula |
|---|---|---|---|
| Comparative Example 1 | 450 | 1 | $CF_{0.46}$ |
| Example 3 | 450 | 10 | $CF_{0.67}$ |

When the product obtained in Comparative Example 1 was further subjected to heat treatment in $F_2$ (200 mmHg) at 450° C. for 9 hrs., the empirical formula was changed to $(CF_{0.67})_n$. The resulting product $(CF_{0.67})_n$ was further heated in $F_2$ (200 mmHg) at 600° C. for 120 hrs. but did not show any change in the F/C ratio. These facts show that the $(CF_{0.46})_n$ still contained unreacted graphite, which was affirmed by the microscopic examination. The X-ray diffraction powder pattern and ESCA spectrum showed that the product $(CF_{0.67})_n$ was substantially $(C_2F)_n$.

COMPARATIVE EXAMPLES 2 AND 3

The substantially same procedure as described in Example 1 were repeated, except that the reaction temperature and time were varied. The reaction conditions and the results are shown below.

| | Temperature, °C. | Time, hrs. | Empirical formula |
|---|---|---|---|
| Comparative Example 2 | 375 | 5 | $CF_{0.18}$ |
| Comparative Example 3 | 375 | 45 | $CF_{0.42}$ |

When the product obtained in Comparative Example 2 was further subjected to heat treatment in $F_2$ (200 mmHg) at 375° C. for 40 hrs. the empirical formula was changed to $(CF_{0.42})_n$. The resulting product $(CF_{0.42})_n$ was further heated in $F_2$ (200 mmHg) at 375° C. for 120 hrs. to give a product of the formula $(CF_{0.58})_n$. The resulting product $(CF_{0.58})_n$ was heat-treated in $F_2$ (200 mmHg) at 600° C. for 120 hrs. but did not show any change in the F/C ratio. These facts show that the $(CF_{0.18})_n$ and $(CF_{0.42})_n$ still contained unreacted graphite, which was affirmed by the microscopic examination. The X-ray diffraction powder pattern and ESCA spectrum showed that the product $(CF_{0.58})_n$ was substantially $(C_2F)_n$.

COMPARATIVE EXAMPLES 4 AND 5

The substantially same procedures as described in Example 1 were repeated, except that the reaction temperature and time were varied. The reaction conditions and the results are shown below.

| | Temperature, °C. | Time, min. | Empirical formula |
|---|---|---|---|
| Comparative Example 4 | 480 | 10 | $CF_{0.27}$ |
| Comparative Example 5 | 480 | 30 | $CF_{0.48}$ |

When the product obtained in Comparative Example 4 was further subjected to heat treatment in $F_2$ (200 mmHg) at 480° C. for 25 min., the empirical formula was changed to $(CF_{0.48})_n$. The resulting product $(CF_{0.48})_n$ was further heated in $F_2$ (200 mmHg) at 480° C. for 5 hrs. to give a product of the formula $(CF_{0.78})_n$. The resulting product $(CF_{0.78})_n$ was heat-treated in $F_2$ (200 mmHg) at 600° C. for 120 hrs. but did not show any change in the F/C ratio. These facts show that the $(CF_{0.27})_n$ and $(CF_{0.48})_n$ still contained unreacted graphite, which was affirmed by the microscopic examination. The X-ray diffraction powder pattern and ESCA spectrum showed that the product $(CF_{0.78})_n$ was substantially $(C_2F)_n$.

EXAMPLES 4 TO 5

The substantially same procedure as described in Example 1 were repeated except that heat-treated petroleum coke (Franklin's P-value=0.31, heat treatment: 2,800° C. for 30 minutes) of a sieve size of more than 400 mesh was employed in place of the natural graphite and the reaction conditions were varied as indicated below.

| | Temperature, °C. | Time, hrs. | Empirical formula |
|---|---|---|---|
| Example 4 | 420 | 5 | $CF_{0.71}$ |
| Example 5 | 330 | 100 | $CF_{0.61}$ |

The products $(CF_{0.71})_n$ and $(CF_{0.61})_n$ were heat-treated in $F_2$ (200 mmHg) at 550° C. for 120 hrs. but did not show any change in their structures, respectively. The color changed from black to white.

EXAMPLE 6

The substantially same procedures as described in Example 1 were repeated except that heat-treated petroleum coke (Franklin's P-value=0.6, heat treatment: 2,200° C. for 30 minutes) of a sieve size of more than 400 mesh was employed in place of the natural graphite and the reaction conditions were varied as indicated below.

| Temperature, °C. | Time, hrs. | Empirical formula |
|---|---|---|
| 320 | 90 | $CF_{0.64}$ |

The product $(CF_{0.64})_n$ was heat-treated in $F_2$ (200 mmHg) at 550° C. for 120 hrs. but did not show any change in its structure. The color change from black to white.

COMPARATIVE EXAMPLE 6

The substantially same procedures as described in Example 1 were repeated except that heat-treated petroleum coke (Franklin's P-value=0.97, heat treatment: 1.630° C. for 30 minutes) of a sieve size of more than 400 mesh was employed in place of the natural graphite and the reaction conditions were varied as indicated below.

| Temperature, °C. | Time, hr. | Empirical formula |
|---|---|---|
| 420 | 5 | $CF_{0.91}$ |

The product $(CF_{0.91})$ is white and substantially of the formula $(CF)_n$. The yield is only several % with respect to the fluorine employed.

COMPARATIVE EXAMPLE 7

The substantially same procedures as described in Example 1 were repeated except that non-treated petroleum coke (Franklin's P-value=1.0) of a sieve size of more than 400 mesh was employed in place of the natural graphite and the reaction conditions were varied as indicated below.

| Temperature, °C. | Time, hrs. | Empirical formula |
|---|---|---|
| 375 | 2 | $CF_{0.92}$ |

The product $(CF_{0.92})_n$ is white and substantially of $(CF)_n$. The yield is only several % with respect to the fluorine employed.

In most of the examples given hereinabove, a period of time as long as 120 hours was employed for the heat treatment. But, such long time heat treatment was conducted for simultaneously observing both of the increase in crystallinity and the stoichiometrical stability of the product. Only for increasing crystallinity of the product, it is sufficient to conduct a heat treatment for about 5 to about 10 hours.

In the meantime, the IR studies described herein were conducted employing an IR apparatus of 27G type (manufactured and sold by Shimazu Seisakusho, Japan) and a tablet of KBr.

It is clearly understood from the above examples that according to the present invention there are provided a new $(C_2F)_n$ having excellent characteristics and a preparation method thereof which is advantageous in various respects. But, further features and advantages of the present invention are apparent from many experimental data given in the detailed description given before.

What is claimed is:

1. A chemical compound poly-dicarbon monofluoride represented by the formula $$(C_2F)_n$$

and having a crystalline structure in which a layer structure [as shown in FIG. 12 hereof] is stacked with an interlayer spacing of about 9.0 Å to form a packing structure, *said crystalline structure exhibiting a peak at about 10° in terms of an angle of 2θ in the X-ray diffraction powder pattern.*

2. A chemical compound poly-dicarbon monofluoride according to claim 1, wherein it has a crystallinity of 490° to 570° C. in terms of a thermal decomposition temperature in an atmosphere of argon.

3. A chemical compound poly-dicarbon monofluoride according to claim 1, wherein it has a color varying from black through grey to white.

4. A chemical compound poly-dicarbon monofluoride according to claim 3, wherein it has a white color.

5. A poly-carbon fluoride composition consisting essentially of $C_2F$ stoichiometry and CF stoichiometry, the content of $C_2F$ stoichiometry being more than 50 mole %, based on the composition.

* * * * *